B. MESTECHKIN.
METHOD OF COATING FINGER RINGS.
APPLICATION FILED OCT. 5, 1920.
1,382,438. Patented June 21, 1921.
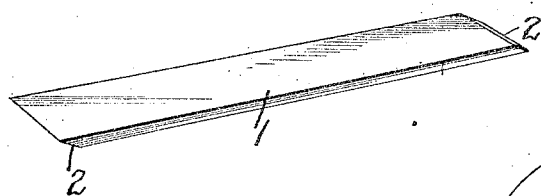
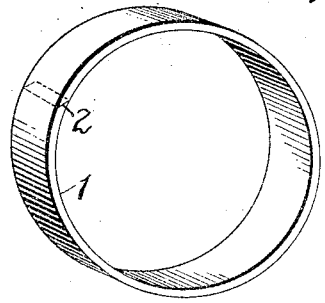
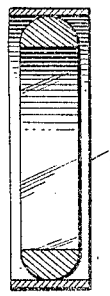
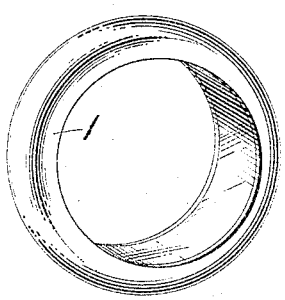
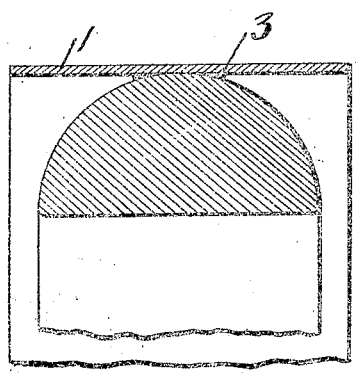
Inventor
Bernard Mestechkin,
By E.T. & J.F. Brandenburg
his Attorneys

UNITED STATES PATENT OFFICE.

BERNARD MESTECHKIN, OF WASHINGTON, DISTRICT OF COLUMBIA.

METHOD OF COATING FINGER-RINGS.

1,382,438.      Specification of Letters Patent.      Patented June 21, 1921.

Application filed October 5, 1920. Serial No. 414,798.

*To all whom it may concern:*

Be it known that I, BERNARD MESTECHKIN, citizen of the United States, residing at Washington, in the District of Columbia, have invented certain new and useful Improvements in Methods of Coating Finger-Rings, of which the following is a specification.

This invention relates to the art of uniting dissimilar metals, and is concerned more particularly with a novel method of coating rings made, for instance, of gold, with platinum.

One of the objects of the invention is to convert an ordinary gold ring into a ring resembling exteriorly a platinum ring.

A second object is to provide a novel method of so coating a gold ring so as not to destroy or interfere with the usual engraving inside the ring.

Referring briefly to the accompanying drawing:

Figure 1 is a view, in perspective, of a platinum blank of a peculiar shape, adapting it to be used in coating a ring constructed, for instance, of gold.

Fig. 2 is a view, in perspective, of the platinum blank as shaped by the first step in my method.

Fig. 3 is a diametric sectional view of a ring and of the platinum blank encircling the same, prior to being bent into position upon the ring.

Fig. 4 is a sectional view of a ring and the platinum blank, showing more particularly the solder therebetween.

Fig. 5 is a diametric sectional view of the ring and of the platinum blank after being formed by the final step in my method, and Fig. 6 is a view, in perspective, of the ring with the platinum coating, resulting from the application of my method.

In carrying out my method, I take a platinum strip 1 of rectangular form, as shown in Fig. 1, of the proper length to encircle a ring when bent therearound, and scarf or bevel the ends thereof, as shown at 2, 2. I then bend the strip 1 into circular form, as shown in Fig. 2, with the scarfed ends abutting, as shown, and secure said ends together in any suitable manner, as by solder or the like.

I then place the circular band shown in Fig. 2 around the ring, as shown in Fig. 3, and preferably dispose a small amount of solder 3 between said band and the ring, and thereafter spin or roll the platinum strip around the exterior surface of the ring, as shown in Fig. 5. It will be seen by inspection of Fig. 5, that the platinum strip so spun around the ring covers the periphery thereof and closely hugs the same. The ring, thus platinum covered, is highly heated to melt the solder 3, and I also solder the platinum hoop to the gold ring along the circumferential edges of the hoop and ring. By the method described, in which the ring is heated, melting the solder, the platinum hoop is firmly united to the gold ring, against working loose in use, and the platinum hoop and gold ring thus form a unit and, in effect, an integral structure.

A ring is thus produced having the exterior appearance of a platinum ring, the gold being entirely concealed when the ring is on the finger of the user. It will also be seen that the engraving within the ring is not disturbed or obliterated.

Any suitable tool or tools may be used in bending the platinum band around the exterior of the ring.

What I claim to be new is:

The method of coating finger rings with platinum, which consists in forming a platinum strip of a length, when bent into annular form, to encircle and bear against the periphery of the ring, then bending said strip into hoop form around the ring, then soldering the hoop and ring adjacent the contacting portions thereof, then spinning said hoop over the periphery of the ring so as closely to hug the same and conform to the curvature thereof, then soldering the edges of the platinum hoop inside of the ring, thereby firmly uniting said band to said ring and forming an integral structure.

In testimony whereof, I affix my signature.

BERNARD MESTECHKIN.